Figure 1:
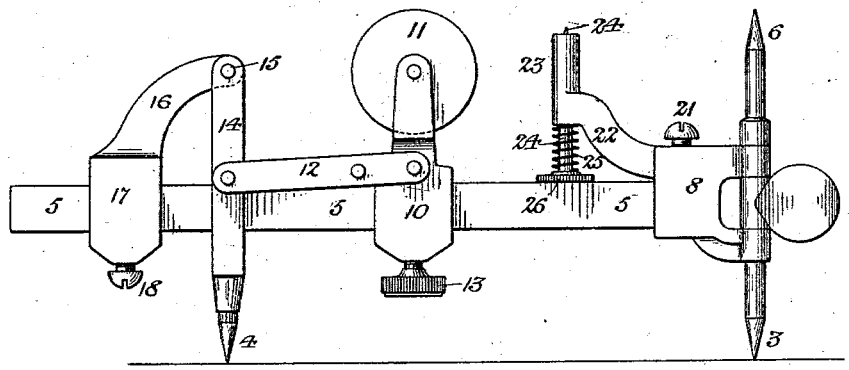

No. 752,470. PATENTED FEB. 16, 1904.
R. SCHIERBECK.
MEASURING INSTRUMENT.
APPLICATION FILED JAN. 15, 1903.
NO MODEL. 2 SHEETS—SHEET 1.

Witnesses:
Chas. W. Cox.
Herman E. Metius

Inventor:
Rudolf Schierbeck,
by his Attorneys,
Howson & Howson

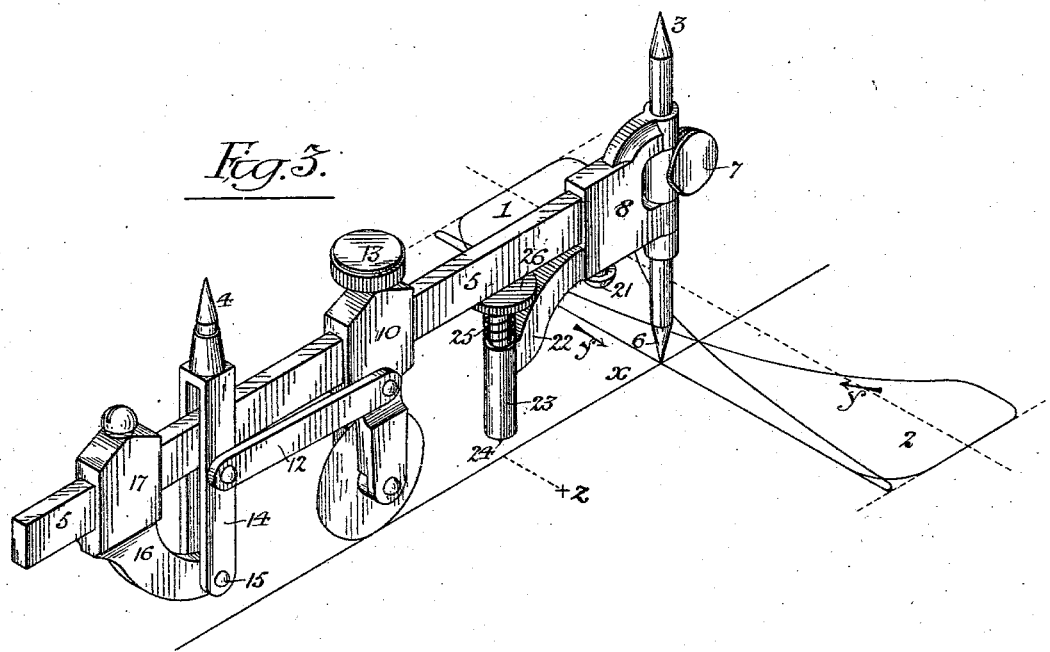

No. 752,470. Patented February 16, 1904.

UNITED STATES PATENT OFFICE.

RUDOLF SCHIERBECK, OF PHILADELPHIA, PENNSYLVANIA.

MEASURING INSTRUMENT.

SPECIFICATION forming part of Letters Patent No. 752,470, dated February 16, 1904.

Application filed January 15, 1903. Serial No. 139,133. (No model.)

*To all whom it may concern:*

Be it known that I, RUDOLF SCHIERBECK, a citizen of the United States, residing in Philadelphia, Pennsylvania, have invented certain Improvements in Measuring Instruments, of which the following is a specification.

My invention relates to the instruments designed to measure steam-engine diagrams for the purpose of ascertaining the mean height of the same, and consequently the mean effective pressure of steam.

The instrument which I have devised I have termed a "diagrammeter," inasmuch as its specific work is the measuring of steam-engine diagrams. For use with my improved measuring instrument I have devised a table of distances, which are marked with figures representing the mean effective pressure of steam in pounds, and the instrument and scale are intended to be used in combination with each other. The present scale is based upon a spring set at fifty pounds, the lines representing inches and fractions of inches, which, multiplied by the weight of the spring, will indicate the mean effective pressure in pounds.

My invention is illustrated in the accompanying drawings, in which—

Figure 2:
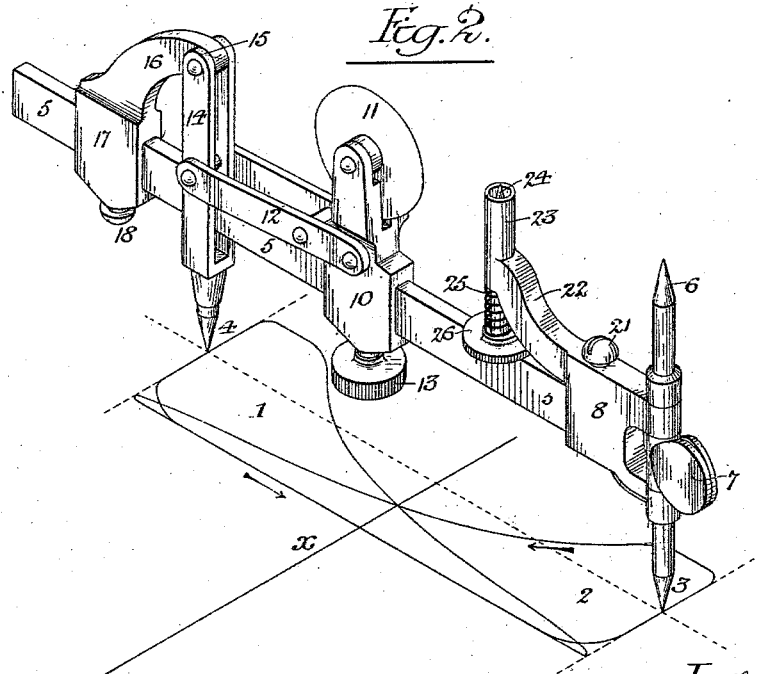

Figure 1 is a view in elevation of my improved measuring instrument. Fig. 2 is a perspective view showing it in the position of measuring the distance between the perpendicular of the diagrams. Fig. 3 is a perspective view showing the instrument in the position to commence tracing the diagram, and Fig. 4 is a view of the scale which I employ.

In the drawings herewith, 1 and 2 represent the diagrams to be measured made by any form of steam-indicator, and these diagrams are usually in pairs, showing the condition of the steam within the cylinder at both strokes of the piston. The instrument has been devised for the purpose of determining the mean height of these diagrams. The original method of determining this mean height was by means of a series of perpendicular lines transcribed across the diagrams. The heights of each line were added together and this sum divided by the number of such lines, giving as a result the mean height. This method, necessarily very crude, was superseded by a number of instruments, some of which are in use at the present day, and the instrument forming the subject of my invention is intended, first, to measure the distance between the perpendiculars, then trace the outline of the diagram, and, finally, to make a mark at a certain point with reference to a center line passing through said diagrams, the distance between such point and the center line indicating the mean height of said diagrams, and when measured upon the scale which I employ will show in pounds the mean effective pressure of steam.

When measuring the distance between the perpendiculars of the diagrams, the instrument is placed in the position shown in Figs. 1 and 2, the fixed point 3 being placed over one perpendicular and the adjustable point 4 being placed over the other perpendicular and then secured in such adjusted position. Both of these points are carried by the longitudinal bar 5. The fixed point 3 has a supplementary point 6, and when in either of the positions shown in Figs. 2 or 3 one or the other of these points forms a pivot upon which the balance of the instrument may be swung, such points being provided with a movable thumb-piece 7, pivoted to the bracket 8, holding the points, whereby the instrument may be moved without the necessity of touching any other portion of the same.

Mounted on the bar 5 is an adjustable bracket 10, carrying a sharp-edged roller 11, the periphery of which is in the same plane as the point 6. This adjustable bracket is connected to the adjustable point 4 by means of the links 12, and the adjustment of this point is by means of this member 10, the latter being provided with a set-screw 13, so as to be held in this adjusted position. The adjustable point 4 is carried by a bifurcated arm 14, passing on either side of the bar 5, which arm is connected at 15 to an arm 16 of a bracket 17, held to the bar 5 by means of a set-screw 18. This bracket 17 may be set at any position on the bar 5 to accommodate the size of the diagrams to be operated upon, then fixed, and of course this position does not affect the adjustability of the point 4. The points 3 and 6, as before noted, are carried by the bracket 8, which is fixed with relation to the bar 5 by a set-screw 21, and this position is always being maintained by the same. This bracket 8 has an extension or arm 22, carrying a tubular member 23, adapted to receive a pin 24, such pin being held in the normally retracted position by means of a spring 25, interposed between the tubular member and the head 26 of said pin. The pin is disposed at a point intermediate the tracing-point 6 and the wheel or roller 11, and its purpose is to make a mark adjacent to the center line of the diagrams after the said point 6 has traced the contour or boundary of either or both of the same.

The method of using my improved instrument is as follows: It is first employed in the position shown in Figs. 1 and 2 in measuring the distance between the perpendiculars of the diagram. After this has been determined the position of the movable point 4 is located by means of a set-screw 13, carried by the bracket 10. The instrument is then reversed and placed in the position shown in Fig. 3, with the point 6 at the junction of the base of the diagrams and a line x drawn through the center of these diagrams, the wheel being directly on said line. The instrument is then moved by grasping the thumb-piece between the thumb and finger, and the point 6 is traced around the boundary-lines of one of the diagrams, the wider end of such diagram being measured first—that is to say, for the diagram 2 the said pointer should move in the direction of the arrow y. As this point is tracing the boundary the wheel or roller 11 follows it freely, and care should be taken to grasp the thumb-piece sufficiently firm, so that the only movement of the wheel will be due to a direct following after the pointer or tracing member. When the tracing of the boundary-line has been finished, the instrument will rest at an angle to the base-line of the diagrams and the center line x, and when in this position the marking point or pin 24 is depressed, making a perforation which is indicated at z. The distance from this mark to the center line of the diagrams is the mean height of said diagrams, and if such distance be measured off on the scale shown in Fig. 4 the mean effective pressure of steam in pounds may be determined, in the present instance being indicated at twenty-six pounds. The opposite diagram will be measured in precisely the same manner, and by this means the mean effective pressure of steam for each stroke of the piston may be readily determined.

Having thus described my invention, I claim and desire to secure by Letters Patent—

1. In a measuring instrument, the combination of a bar, adjustable measuring means carried by said bar and having its points disposed on one side of the same, tracing means disposed on the opposite side of said bar, said tracing element being in line with one of the measuring-points, and a marking-point bearing a definite relation to the tracing means.

2. In a measuring instrument, the combination of the bar, adjustable measuring means carried by said bar and having the measuring-points disposed on one side of the same, a tracing-point disposed on the opposite side of said bar in line with one of the measuring-points, a marking-point having a fixed relation to the tracing-point, and a follower-wheel disposed on the same side of the bar as the tracing-point and having a fixed relation to the other measuring-point.

3. In a measuring instrument, the combination of a bar, adjustable measuring-points carried thereby and projecting from one side of the same, a tracing-point and a follower-wheel projecting from the opposite side of the same, and a marking-point for indicating the mean height of the diagrams after the boundaries of the latter have been covered by said tracing-point, said marking-point having a fixed relation with respect to the tracing-point, and said follower-wheel having a fixed relation with respect to the measuring-point at the opposite end of the bar.

4. In a measuring instrument, the combination of a bar, measuring means comprising a fixed point carried by said bar and forming one element of the same, and an adjustable point carried by the opposite end of said bar and forming the other element of the measuring means, and a supplementary member carried by the bar and connected to the adjustable point and serving to give the latter a fine adjustment, said supplementary member carrying a follower-wheel.

5. The combination in a measuring instrument, of the bar, a tracing-point carried thereby, a fixed measuring-point on the opposite side of the bar, an adjustable measuring-point at the opposite end of the bar, a follower-wheel, a movable bracket carrying the same, means for securing said bracket to the bar, and connections between said bracket and the adjustable measuring-point whereby the position of the latter always affects the position of the follower-wheel with respect to the tracing-point.

6. In a measuring instrument, the combination of the tracing-point, a bar to which said point is connected, a follower-wheel also carried by said bar, and a pin disposed between said point and wheel for the purpose of marking a card after the tracing-point has passed around the boundary of the diagram.

7. In a measuring instrument, the combination of the bar, the measuring-points carried thereby, one of which is fixed, a fixed tracing-point in line therewith, and a movable thumb-piece interposed between said points and serving as a pivot for the instrument whereby the latter may be moved, the bracket carrying the tracing-point and fixed measuring-point having a space for the reception of the thumb-piece.

In testimony whereof I have signed my name to this specification in the presence of two subscribing witnesses.

RUDOLF SCHIERBECK.

Witnesses:
  MURRAY C. BOYER,
  WILLIAM F. BEATON.